T. W. WHITE.
Cotton Planter.
No. 18,482.
Patented Oct. 20, 1857.
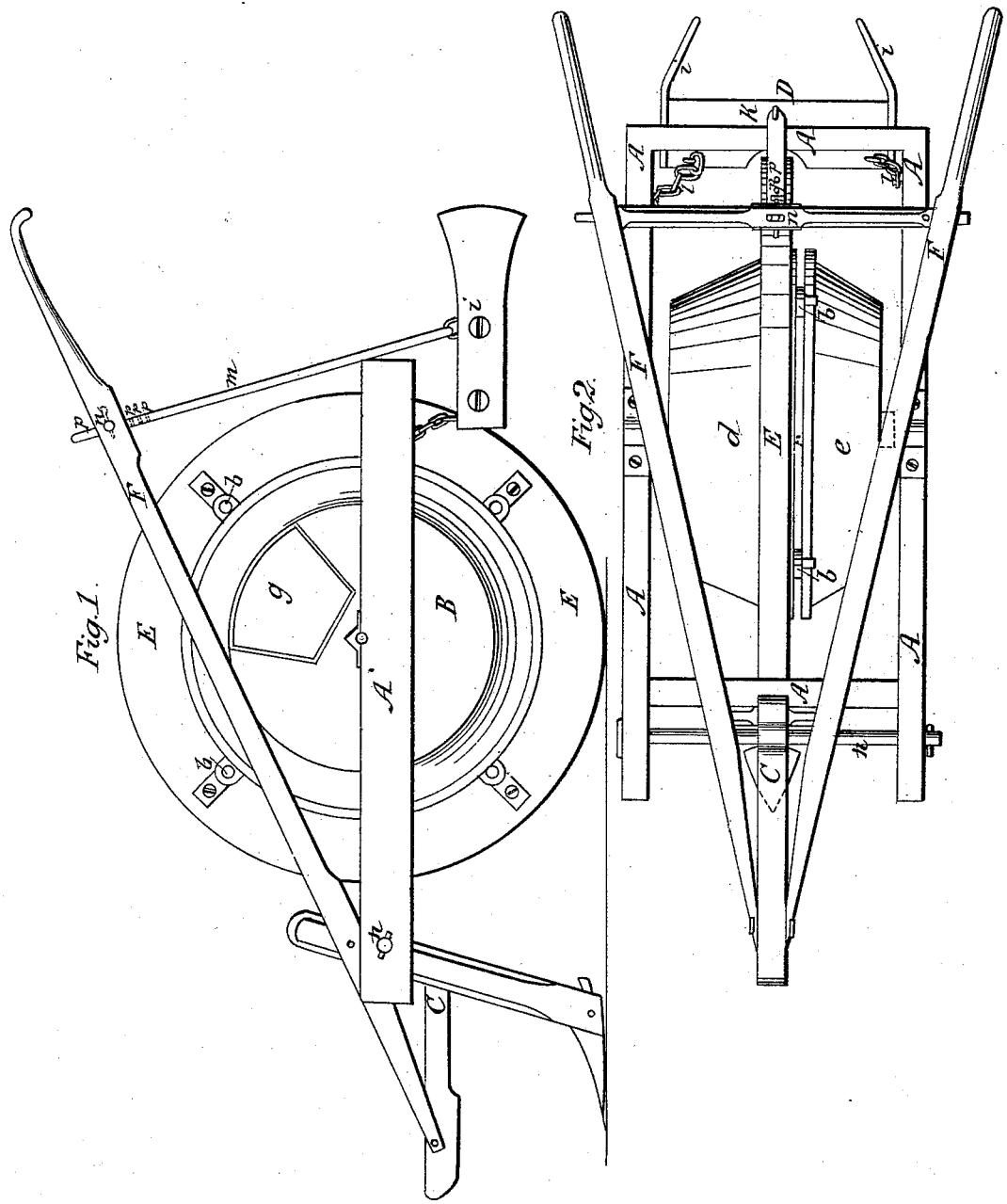

UNITED STATES PATENT OFFICE.

T. W. WHITE, OF MILLEDGEVILLE, GEORGIA.

IMPROVEMENT IN COTTON-SEED PLANTERS.

Specification forming part of Letters Patent No. 18,482, dated October 20, 1857.

*To all whom it may concern:*

Be it known that I, T. W. WHITE, of the county of Baldwin, in the State of Georgia, have invented certain new and useful Improvements in Cotton-Seed Planters, of which the following is a full, clear, and exact description, reference being had to the accompanying drawings, forming part of this specification, in which—

Figure 1 represents a side elevation of a cotton-seed planter embracing my improvements, and Fig. 2 represents a plan of the same.

My improvements relate to that class of cotton-seed planters in which the hopper for holding the seed rests upon and rolls over the surface of the ground as the machine moves forward. The objections to these machines as heretofore constructed are the difficulty of guiding the machine so as to form straight furrows, the choking (with earth) of the openings in the hopper, the scattering of the seed over the sides instead of delivering them regularly in the center of the drill, and the imperfect manner in which the seed are covered.

The object of my improvements is, by overcoming these objections, to render this class of seed-planters more simple and effective, and thereby adapt them more thoroughly to the necessities of the planter; and my invention consists, first, in raising the hopper above the ground by means of a deep flange which encircles the hopper close to one edge of the opening for the discharge of the seed and in the same vertical plane as the plow, by which means the opening is prevented from coming in contact with and being choked by the earth, and as the flange follows in the furrow opened by the plow, it steadies the machine and prevents lateral vibration, while the seeds are deposited in a straight line in the center of the drill and not scattered over the sides of the furrows; second, in attaching the plow to the frame of the machine by a flexible connection, and also with the seed-coverer by an adjustable link, so that the point of the plow may be directed in accordance with the undulations of the ground, without tipping the frame or changing the line of draft of the seed-coverer, and the pressure on the seed-coverer varied so as to cover the seed uniformly in light and compact soil, and also the position of the seed-coverer varied in relation to the plowshare, thereby regulating the depth to which the seed are covered as circumstances may demand.

The accompanying drawings represent a cotton-seed planter embracing my improvements. This machine consists of a rectangular frame, A, which rests upon and is supported by a shaft passing through a seed-hopper, B. To the forward end of this frame the plow C is attached, while at the rear end of the frame and connected to it by chains is a seed-coverer, D, for filling the furrow made by the plow.

The seed-hopper B consists of two hollow frustra of cones closed at their smaller or outer ends, and mounted, with their bases toward each other, upon a shaft, $a$, and kept apart by means of washers $b$, so as to leave an annular opening, $r$, between them for the discharge of the seed. One of these frustra, $d$, is fixed to the shaft, and the other, $e$, is movable by means of a set-nut upon the shaft for the purpose of varying the width of the discharge-opening. Any other device—as a flange attached to the head of the hopper and confined to the shaft by set-screws—may be substituted for the nut and washers, and thus leave the annular opening unobstructed.

The seed are introduced into the hopper through a sliding door, $g$. The ends of the hopper, being of less diameter than the center, are raised still higher above the ground, owing to which the liability of their encountering and being injured by obstructions is greatly diminished, while the sloping of the surface of the hopper toward the discharge-opening gives greater certainty and regularity to the discharge of the seed when the quantity within the hopper diminishes. A deep ring or flange, E, encircles one of the frustra at the point of its greatest diameter and close to the edge of the discharge-opening and in the same vertical plane as the plow C. This flange raises the hopper so high above the ground that the discharge-opening does not come in contact with the earth, and it also protects the hopper from striking against rocks or other obstructions and greatly increases its stiffness and strength.

The plow C, which is of the usual construction, is hinged to the forward end of the frame A by a bolt, $h$, passing through the sides of the frame and through the stock of the plow.

The handles F of the plow extend back beyond the rear of the frame and serve to guide the machine.

The seed-coverer D consists of two flat bars, $i$, which are connected together at their front ends by a cross-piece, $k$. The rear ends of these bars are wider than their front ends, slightly concave, and curved or inclined toward each other, so as to collect the earth from the sides and draw it toward the center of the drill. This coverer is attached to the sides of the frame A, at its rear end, by means of two chains, $l$, which allow it to yield in any direction and adapt itself to the inequalities of the ground without diverting or changing the position of the other parts of the machine. A rod, $m$, which is hinged to the cross-bar $p$ of the coverer, extends upward and passes through a socket, $n$, in the cross-bar $o$, connecting the plow-handles F. A series of holes, $h$, are made in this rod $m$, near the top, for the purpose of adjusting the height of the coverer, and a pin passing through the socket into one of these holes connects the rod $m$ to the cross-bar $o$.

It will be seen that from the manner in which the plow is hinged to the frame the point of the plow is directed by the handles, so as to vary the furrow with the undulations of the ground without tipping the frame, thereby changing the line of draft of the seed-coverer. The seed-coverer is also steadied by its connection with the plow and prevented from bounding over the surface of uneven and compact ground by pressure being applied to the plow-handles, which causes it to enter the ground uniformly, thereby covering the seed regularly. The position of the seed-coverer in relation to the plowshare regulates the depth to which the seed are covered, and may be varied according to circumstances by means of the connecting-rod $m$. When adjusted to the proper depth for covering the seed they preserve the same relation to each other when the machine is in motion, so that the depth to which the seeds are covered in the drills is rendered uniform, and in a great measure independent of the skill of the operator.

The flange E, encircling the hopper, being in the same vertical plane as the plow, follows directly in its furrow, by which means lateral vibration of the hopper is avoided, steadiness is given to the motion of the whole machine, and the wabbling and serpentine motion that would otherwise occur is avoided. The seed as they are delivered fall by the side of the flange, and are deposited in a straight line nearly in the center of the furrow.

It will be seen that owing to the manner in which the different parts of the machine are hinged and connected with each other one part may yield vertically and adapt itself to the undulations of the soil without changing the position of the other parts, and it is owing to this that the danger of breaking the machine or throwing it out of line when one part only comes in contact with obstructions is much less than in those machines which have their parts rigidly connected.

Having thus described my improved cotton-seed planter, what I claim therein as new, and desire to secure by Letters Patent, is—

1. The arrangement of the flange in relation to the hopper and the plow, so that it will follow in the furrow made by the plow and elevate the discharge-opening for the seed above the ground, for the purpose described.

2. The combination of the plow, the seed-coverer, and the adjustable connecting-rod $m$, when arranged in the manner and for the purpose set forth.

In testimony whereof I have hereunto subscribed my name.

T. W. WHITE.

In presence of—
  JOHN S. HOLLINGSHEAD,
  F. SOUTHGATE SMITH.